United States Patent
Öhman et al.

(10) Patent No.: US 11,541,768 B2
(45) Date of Patent: Jan. 3, 2023

(54) ARRANGEMENT AND METHOD FOR ACTIVE ALIGNMENT CONTROL OF A CONTACT ELEMENT

(71) Applicant: VOLVO TRUCK CORPORATION, Gothenburg (SE)

(72) Inventors: Mikaela Öhman, Gothenburg (SE); Sten Engström, Härryda (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 728 days.

(21) Appl. No.: 16/482,850

(22) PCT Filed: Feb. 15, 2017

(86) PCT No.: PCT/EP2017/053365
§ 371 (c)(1),
(2) Date: Aug. 1, 2019

(87) PCT Pub. No.: WO2018/149492
PCT Pub. Date: Aug. 23, 2018

(65) Prior Publication Data
US 2020/0009976 A1    Jan. 9, 2020

(51) Int. Cl.
*B60L 53/35* (2019.01)
*B60L 53/14* (2019.01)
(Continued)

(52) U.S. Cl.
CPC ............. *B60L 53/35* (2019.02); *B60L 5/38* (2013.01); *B60L 53/14* (2019.02); *B60K 6/28* (2013.01);
(Continued)

(58) Field of Classification Search
CPC . B60L 53/35; B60L 53/14; B60L 5/38; B60K 6/28; B60Y 2200/91; B60Y 2200/92; B60Y 2300/91
(Continued)

(56) References Cited

U.S. PATENT DOCUMENTS 4,129,203 A * 12/1978 Berman .................... B60L 5/40
  191/4
4,476,947 A * 10/1984 Rynbrandt .............. B60L 50/53
  180/2.1
(Continued)

FOREIGN PATENT DOCUMENTS

CN       1463868 A    12/2003
CN    101092114 A *  12/2007
(Continued)

OTHER PUBLICATIONS

Chinese Office Action dated Mar. 16, 2022 in corresponding Chinese Patent Application No. 201780086107.4, 21 pages.
(Continued)

*Primary Examiner* — Suresh Memula
(74) *Attorney, Agent, or Firm* — Venable LLP; Jeffri A Kaminski

(57) ABSTRACT

The invention relates to an arrangement (100) for active alignment control of a contact element (110) of a charging device (104) for a vehicle (1) for driving on an electrical road system (ERS) comprising a charging surface (3) configured to provide electrical power to the vehicle via the charging device. The arrangement comprises the charging device (104) comprising a base (106), a linkage arm (108), and an electrical contact element (110) and a pivot joint (107) arranged for allowing a movement of the contact element around an axis (105). A control unit is configured to activate an actuator module to align said contact element (110) with said trajectory of said charging surface based on
(Continued)

trajectory data and an angle between the vehicle heading and the charging surface. The invention further relates to a method and to a vehicle.

16 Claims, 8 Drawing Sheets

(51) Int. Cl.
*B60L 5/38* (2006.01)
*B60K 6/28* (2007.10)

(52) U.S. Cl.
CPC ....... *B60Y 2200/91* (2013.01); *B60Y 2200/92* (2013.01); *B60Y 2300/91* (2013.01)

(58) Field of Classification Search
USPC .......................................................... 194/45
See application file for complete search history.

(56) References Cited

U.S. PATENT DOCUMENTS

| | | | |
|---|---|---|---|
| 5,595,271 A | 1/1997 | Tseng | |
| 9,199,541 B2 * | 12/2015 | Asplund | B60M 1/34 |
| 10,279,696 B2 * | 5/2019 | Dow | B60L 53/305 |
| 10,981,459 B1 * | 4/2021 | Davey, Jr. | B60L 53/35 |
| 11,014,459 B2 * | 5/2021 | Sebestyen | B60L 53/14 |
| 2011/0266108 A1 * | 11/2011 | Kitaguchi | B60L 53/14 |
| | | | 191/22 C |
| 2014/0217966 A1 | 8/2014 | Schneider et al. | |
| 2016/0339791 A1 * | 11/2016 | Sim | B60L 53/18 |
| 2017/0129342 A1 | 5/2017 | Tajima et al. | |
| 2019/0381891 A1 * | 12/2019 | Moghe | G06N 20/00 |
| 2020/0139830 A1 * | 5/2020 | Eakins | H02J 7/0045 |
| 2020/0262305 A1 * | 8/2020 | Chakraborty | B60L 53/62 |
| 2021/0086601 A1 * | 3/2021 | Choi | B60L 50/51 |
| 2022/0032800 A1 * | 2/2022 | Naganishi | B60L 53/16 |

FOREIGN PATENT DOCUMENTS

| | | | | |
|---|---|---|---|---|
| CN | 105473374 A | | 4/2016 | |
| CN | 105682978 A | | 6/2016 | |
| CN | 106061790 A | | 10/2016 | |
| CN | 106132765 A | | 11/2016 | |
| CN | 107972523 A | * | 5/2018 | |
| CN | 211764977 U | * | 10/2020 | |
| CN | 111497631 B | * | 8/2021 | ............. B60L 53/12 |
| CN | 214240462 U | * | 9/2021 | |
| CN | 214564686 U | * | 11/2021 | |
| CN | 108136916 B | * | 3/2022 | .......... B60L 11/1831 |
| DE | 4119245 A1 | * | 12/1992 | |
| DE | 4119245 A1 | | 12/1992 | |
| DE | 202011107692 U1 | | 9/2012 | |
| DE | 202011107692 U1 | * | 10/2012 | ................ B60L 5/42 |
| DE | 102018104762 A1 | * | 9/2019 | ................ B60L 53/16 |
| EP | 3390136 B1 | * | 8/2020 | ............. B60L 5/005 |
| JP | 2000050406 A | * | 2/2000 | |
| SE | 201950714 A1 | * | 9/2020 | ................ B60L 5/38 |
| TW | 200940375 A | * | 10/2009 | |
| TW | 200940375 A | | 10/2009 | |
| WO | 2014162015 A1 | | 10/2014 | |
| WO | WO-2017059893 A1 | * | 4/2017 | .......... B60L 11/1831 |
| WO | WO-2018086689 A1 | * | 5/2018 | ................ B60L 5/00 |
| WO | WO-2018149478 A1 | * | 8/2018 | ................ B60L 50/53 |
| WO | WO-2018149492 A1 | * | 8/2018 | ................ B60L 5/38 |
| WO | WO-2020249680 A1 | * | 12/2020 | ................ B60L 5/38 |
| WO | WO-2021108206 A1 | * | 6/2021 | ............. B60L 53/16 |
| WO | WO-2021217984 A1 | * | 11/2021 | ............. B60L 53/16 |

OTHER PUBLICATIONS

International Search Report dated Oct. 26, 2017 in International Application No. PCT/EP2017/053365.
Written Opinion dated Oct. 26, 2017 in International Application No. PCT/EP2017/053365.

* cited by examiner

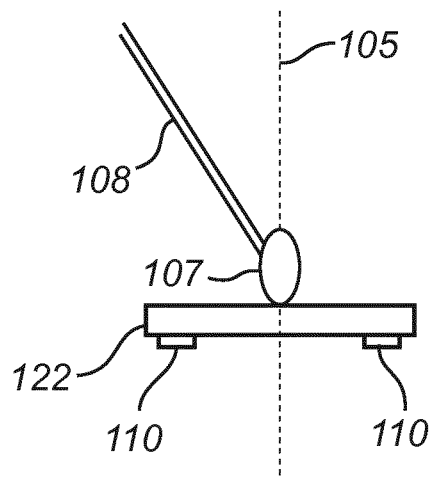
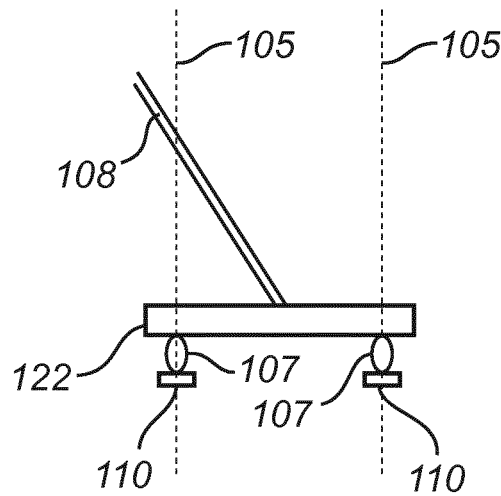
Fig. 5a    Fig. 5b
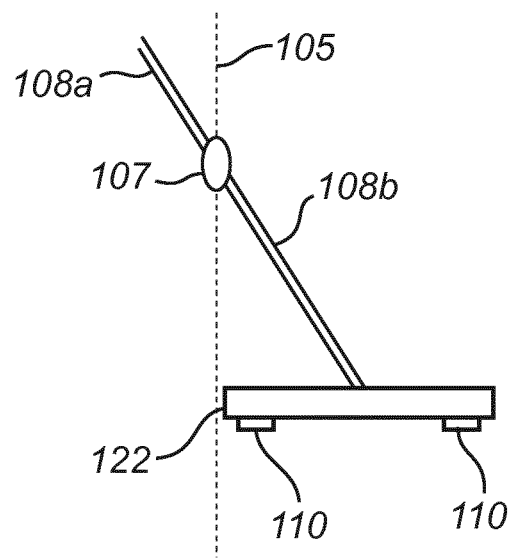
Fig. 5c

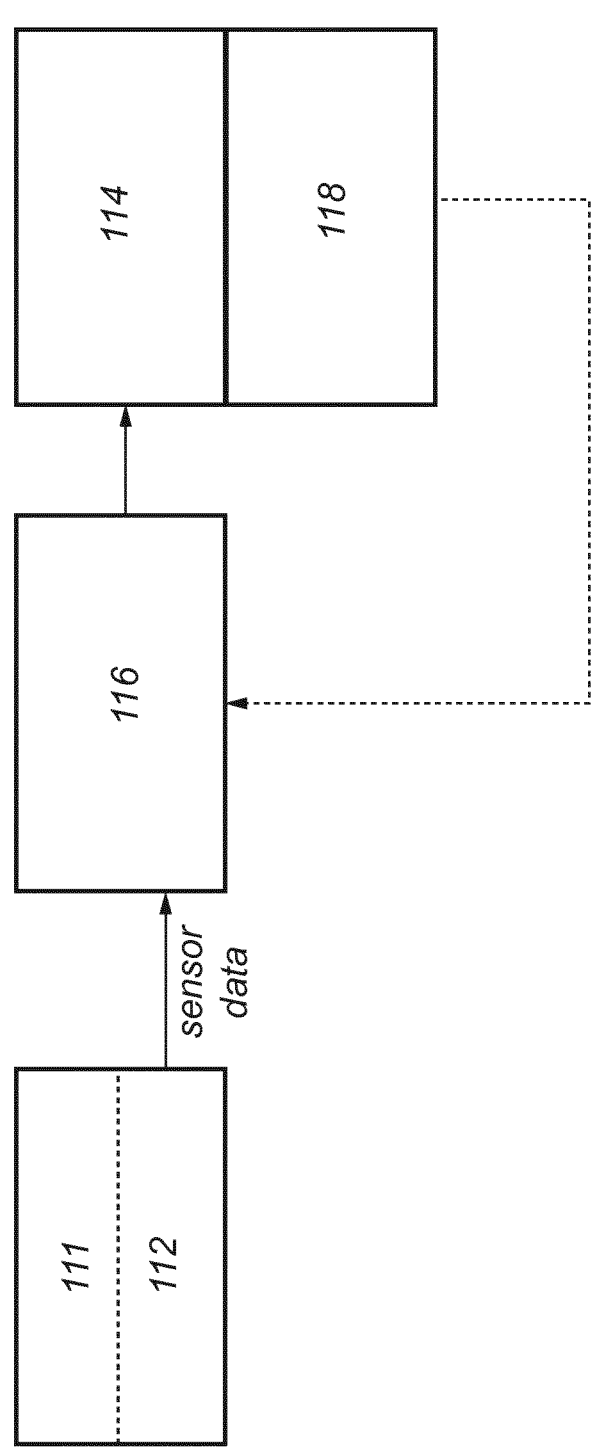

ARRANGEMENT AND METHOD FOR ACTIVE ALIGNMENT CONTROL OF A CONTACT ELEMENT

TECHNICAL FIELD

The invention relates to an arrangement for active alignment control of a contact element of a charging device for a vehicle for driving on an electrical road system. The invention also relates to a corresponding vehicle and a method.

The invention can be applied in any type of electrical or hybrid vehicles, such as trucks, buses, cars and construction equipment operative on an electrical road system. Although the invention will be described with respect to a truck, the invention is thus not restricted to this particular vehicle.

BACKGROUND

Electric and hybrid vehicles are becoming a more common sight on roads worldwide, and they offer a more environmentally friendly alternative to the typical combustions engine driven vehicles. Although the electric and hybrid vehicles provides excellent solutions for reducing the impact of transportation on the environment, the need for recharging the batteries in the case of electric vehicles still partly limits the usability.

Recently, electric road systems have been investigated on which the vehicles may charge its batteries while driving. This may provide increased driving range for electrical vehicles, at least on roads which have the electrical system integrated in the road itself. In such an electric road system, a power line may be integrated in the road such that the vehicle may contact the power line while travelling on the road to thereby withdraw electrical energy from the electrical road system.

However, charging of a battery arranged on board of a moving vehicle via a static power line comes with challenges. For example, alignment of a charging unit of the vehicle with the power lines becomes technically problematic due to the relative motion of the vehicle with respect to the power lines.

U.S. Pat. No. 9,199,541 discloses one attempt at aligning contact means to side-tracks for allowing charging of a battery arranged on a vehicle. The contact means are attached to an arm which is pivotally attached to the vehicle. However, the approach suggested in U.S. Pat. No. 9,199,541 only allows for alignment of contact means with respect to the vehicle, thus the alignment with the side-tracks is likely to fail in some situations, for example when the side-tracks are not parallel with the vehicle. Accordingly, there appears to be room for improvement in relation to alignment of charging units for charging of a moving vehicle via a static power line.

SUMMARY

An object of the invention is to provide an arrangement with improved alignment capabilities for a charging element with respect to a charging surface. In particular, embodiments of the invention provide active aligned control of the contact element with respect to the charging surface.

The object is at least partly achieved by an arrangement according to claim 1.

According to a first aspect of the invention, there is provided an arrangement for active alignment control of a contact element of a charging device for a vehicle for driving on an electrical road system comprising a charging surface configured to provide electrical power to the vehicle via the charging device, wherein the arrangement comprises: the charging device comprising a base, a linkage arm, and an electrical contact element for making electrical contact with the charging surface of the electrical road system, and a pivot joint arranged for allowing a movement of the contact element around an axis substantially perpendicular to the charging surface; wherein the contact element and the base are connected to opposite ends of the linkage arm, and wherein the linkage arm is at least horizontally displaceable for aligning the contact element with the charging surface; a charging surface detection sensor for determining trajectory data indicative of the trajectory of the charging surface; an angle detection sensor module for determining the angle between a vehicle heading and the charging surface in the horizontal plane; an actuator module for controlling the movement of the electrical contact element around the axis substantially perpendicular to the charging surface and for controlling the horizontal displacement of the linkage arm, and a control unit connected to the charging surface detection sensor and the actuator module and configured to activate the actuator module to align the contact element with the trajectory of the charging surface based on the trajectory data and the angle between the vehicle heading and the charging surface.

The present invention is based on the realization that active alignment of the contact element with respect to the charging surface may provide improved alignment control for the contact element with respect to the charging surface. The active control is based on the trajectory of the charging surface and the vehicle heading. Furthermore, the invention is also based on the realization that the contact element is movable around an axis perpendicular to the charging surface which provides for further improved control of the alignment with the charging surface. For example, in situations where the vehicle heading is pointing at an angle with respect to the charging surface and consequently the contact element should not be aligned with the vehicle heading, active control of the contact element orientation according to the invention advantageously provides improved alignment for the contact element with respect to the charging surface compared to prior art solutions. Furthermore, compared to prior art tie rod based devices, the packaging space may be reduced since the alignment control may be integrated in the charging device without a mechanical tie rod. In addition, accurate alignment control provides a possibility to reduce the size of the contact elements thereby advantageously reducing e.g. the weight of the charging device.

The movement of the contact element around the axis is controllable by the actuator module. The movement is realized by electrical actuators of suitable type known in the art.

The horizontal displacement may according to embodiments be anyone of a rotation of the linkage arm about an axis, or a linear displacement of the linkage arm.

The contact element is the part of the charging device and makes electrical contact with the charging surface for transferring electrical charge from a power source associated with the electrical road system to the vehicle. The contact element thus preferably comprises a metallic portion which conducts electrical charge.

Similarly, the charging surface may be any type of surface which is capable of transferring electrical charge from a power source associated with the electrical road system to the vehicle via the contact element. For example, the charging surface may be a rail or a power line integrated in the road.

The pivot joint provides for rotation of the contact element about the axis. The pivot joint may be a so-called "articulated" joint, e.g. a joint in which the rotation of the contact element about the axis is controllable.

It should be noted that the angle detection sensor module may comprise several independent sensors which in a collaborative manner determines the angle between the vehicle heading and the charging surface.

The term "substantially perpendicular" means that a small deviation from an angle of 90° between the axis and the charging surface is allowable and within the scope of the claims. The angle may deviate from 90° as long as electrical contact between the contact element and the charging surface may be possible.

According to one embodiment, the arrangement comprises an actuator sensor module configured to determine measurement data indicative of the horizontal displacement of the linkage arm, and a rotation position of the contact element around the axis, wherein the actuator sensor module is configured to provide the measurement data to the control unit, whereby the control unit is configured to activate the actuator module to align the contact element with the trajectory of the charging surface based on the trajectory data, the angle between the vehicle heading and the charging surface, and the measurement data. Hereby an improvement of the active alignment control is provided by including the measurement data indicative of the horizontal displacement of the linkage arm and a rotation position of the contact element. The measurement data provides a more accurate determination of the orientation of the contact elements with respect to the charging surface. The data may be fed back (e.g. as an actuator feedback) to the control unit such that the control unit may actively control the charging device for aligning the contact element with the trajectory of the charging surface.

The actuator sensor module may be integrated in the actuator module. The rotation position may be a rotation angle with respect to a reference point, for example the linkage arm position. Alternatively, the rotation position may be a step-value indicative of a rotation position of the contact element provided by e.g. an encoder connected to the pivot joint.

According to one embodiment, the horizontal displacement may be a rotational displacement a rotation angle of the linkage arm with respect to the base.

According to one embodiment, the control unit may be configured to activate the actuator module to control the rotation angle of the linkage arm with respect to the base for aligning the contact element with the trajectory of the charging surface. Hereby, in the case where the horizontal displacement being a rotational displacement, an even more accurate alignment of the contact element is provided by the provision of controlling the rotation angle of the linkage arm with respect to the base.

According to another embodiment, the horizontal displacement may be a linear displacement of the base with respect to a guiding rail on which the base is guided. In this case, according to one embodiment, the control unit may be configured to activate the actuator module to control the linear displacement of the linkage arm with respect to the base for aligning the contact element with the trajectory of the charging surface. Thus, a more accurate alignment of the contact element is provided by the provision of controlling the linear displacement of the linkage arm with respect to the base.

The above mentioned pivot joint may be arranged in different advantageous positions providing for flexibility in arrangement configuration. In one embodiment, the linkage arm comprises a first portion and a second portion, wherein pivot joint is arranged to join the first portion with the second portion.

In another embodiment, the charging device comprises a charging head on which the charging element is attached, wherein the pivot joint is arranged to join the linkage arm with the charging head.

In a further embodiment, the charging device may comprise a charging head on which the charging element is attached, wherein the charging head is mechanically attached to the linkage arm, and wherein the pivot joint is arranged to join the charging head with the charging element.

The angle detection sensor may be one of a steering sensor for the vehicle, a camera, a laser sensor, a lidar, or a radar. Furthermore, the charging surface detection sensor may be one of a camera, a laser sensor, a lidar, a global positioning system (GPS), or a radar.

With a GPS, data indicative of the trajectory of the road, and therefore also the charging surface trajectory can be determined from the location of the vehicle and map data indicating the road trajectory. The map data may be received form from GPS map data source loaded into the GPS device of the vehicle or received from the cloud. With the GPS, the control unit may received information about the upcoming trajectory of the charging surface trajectory some time before, e.g. forward-looking data about the charging surface trajectory may be received for example 20-100 metres ahead of the vehicle such that the vehicle may be positioned appropriately on the road.

The arrangement according to the above embodiments and aspects may advantageously be included in a vehicle according to a second aspect of the invention, thus the vehicle comprises such an arrangement for active alignment control of a contact element of a charging device for a vehicle for driving on an electrical road system comprising a charging surface configured to provide electrical power to the vehicle via the charging device.

The vehicle may be an electrical, hybrid, or plug-in hybrid vehicle comprising an electrical engine, wherein an energy storage pack provides power to an electrical engine of the vehicle for providing propulsion for the electrical, hybrid, or plug-in hybrid vehicle. The invention is applicable to any vehicle or electric machine adapted to receive electrical energy from a charging surface in the road, the charging surface being part of an electrical road system.

The object is at least partly achieved also by a method according to claim 12.

According to a third aspect of the invention, there is provided a method for active alignment control a contact element of a charging device for a vehicle for driving on an electrical road system, the charging device comprising a base, a linkage arm, and an electrical contact element for making electrical contact with a charging surface of the electrical road system, and a pivot joint arranged for allowing a movement of the contact element around an axis substantially perpendicular to the charging surface; wherein the contact element and the base are connected to opposite ends of the linkage arm, and wherein the linkage arm is at least horizontally displaceable for aligning the contact element with the charging surface; the method comprising:

determining trajectory data indicative of the trajectory of the charging surface; determining the angle between a vehicle heading and the charging surface in the horizontal plane; aligning the contact element with the trajectory of the charging surface based on the trajectory data and the angle between vehicle heading and the charging surface by: controlling the movement of the contact element around the axis substantially perpendicular to the charging surface, controlling the horizontal displacement of the linkage arm.

The method may further comprise determining measurement data indicative of the horizontal position of the linkage arm, and a rotation position of the contact element around the axis, wherein the aligning is further based on the measurement data.

Effects and features of the third aspect of the invention are largely analogous to those described above in connection with the first aspect.

Furthermore, there is provided a computer program comprising program code means for performing the steps of any of the embodiments of the third aspect when the program is run on a computer.

Furthermore, there is provided a computer readable medium carrying a computer program comprising program code means for performing the steps of any of the embodiments of the third aspect when the program product is run on a computer.

Additionally, there is provided a control unit for controlling active alignment control a contact element of a charging device for a vehicle for driving on an electrical road system, the control unit being configured to perform the steps of any of the embodiments of the third aspect.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples.

In the drawings:

FIG. 5a-c conceptually illustrates locations of a pivot joint on the charging device;

FIG. 7 conceptually illustrates another embodiment of the invention.

DETAILED DESCRIPTION OF EXAMPLE EMBODIMENTS OF THE INVENTION

Figure 1:
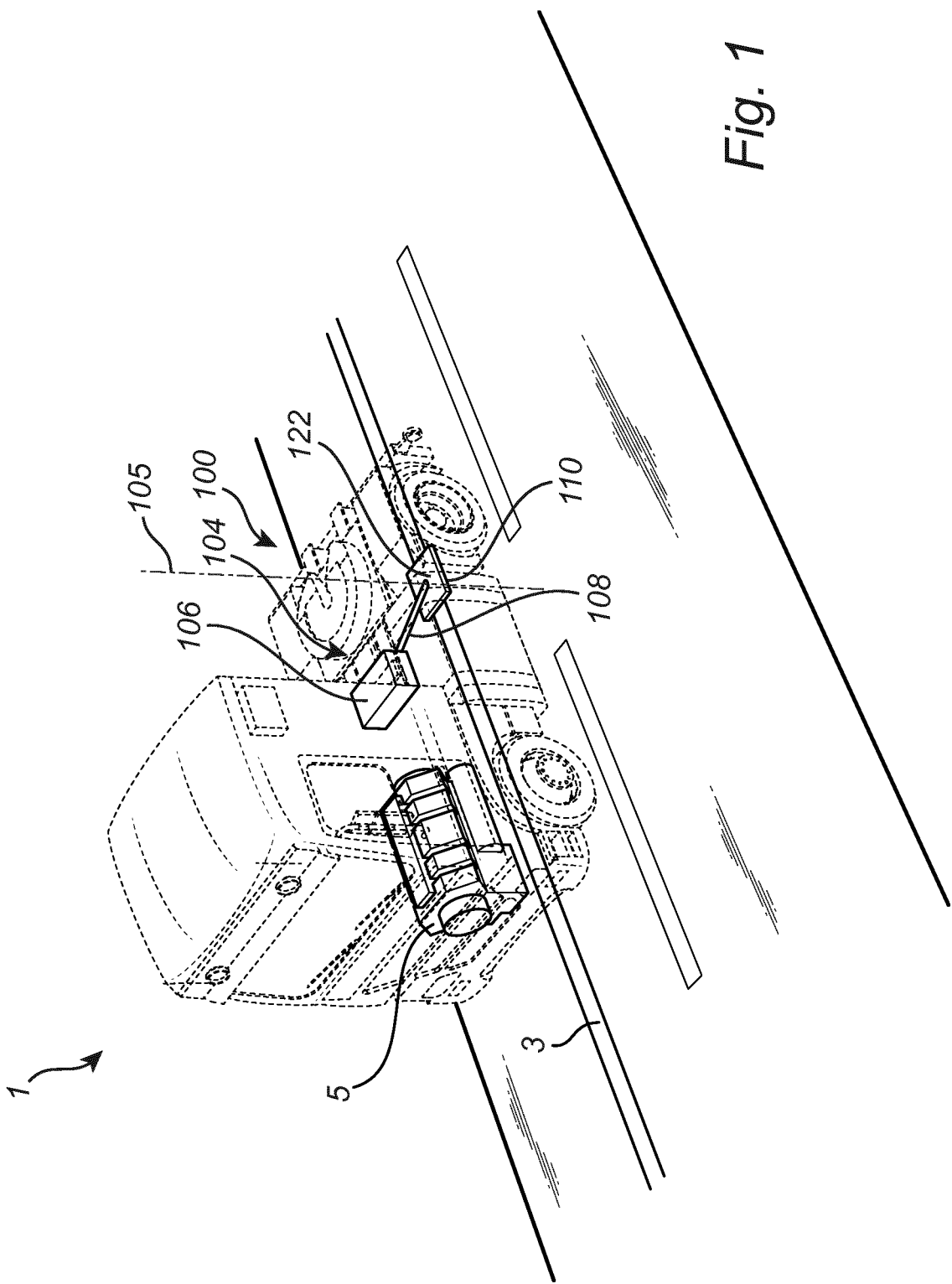
FIG. 1 is a vehicle in the form of a truck according to example embodiments of the invention.

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. The skilled person will recognize that many changes and modifications may be made within the scope of the appended claims. Like reference character refer to like elements throughout the description.

FIG. 1 illustrates a vehicle in the form of a truck 1. The truck is operative on an electrical road system (ERS) comprising a charging surface 3. The truck 1 comprises a charging device 104 comprising a base 106, a linkage arm 108, and a contact element 110 arranged on a charging head 122. The charging device is part of an arrangement 100 for active alignment control of the contact element 110 (the contact element is sometimes referred to as "collector shoes") with respect to the charging surface 3 in the road. The charging surface 3 of the electrical road system may for example be comprised in a rail provided in the road. In operation, the contact element 110 of the charging device 104 makes electrical contact with the charging surface such that electrical charge may be transferred from the electrical road system to the vehicle. In the vehicle (in this case the truck 1), the electrical charge may be used for powering an electrical engine 5 providing propulsion for the vehicle.

The charging device 104 comprises a pivot joint (not shown in FIG. 1) which allows for movement of the contact element 110 around an axis 105 substantially perpendicular to the charging surface 3. The location of the axis 105 in FIG. 1 is exemplary and other locations may be possible, see for example FIGS. 4a-c. The contact element 110 and the base 106 are connected to opposite ends of the linkage arm 108. The linkage arm 108 is at least horizontally displaceable for aligning the contact element 110 with the charging surface 3, as will be further described below with reference to subsequent drawings. Further details of embodiments of the invention will now described with reference to the subsequent drawings.

Figure 2:
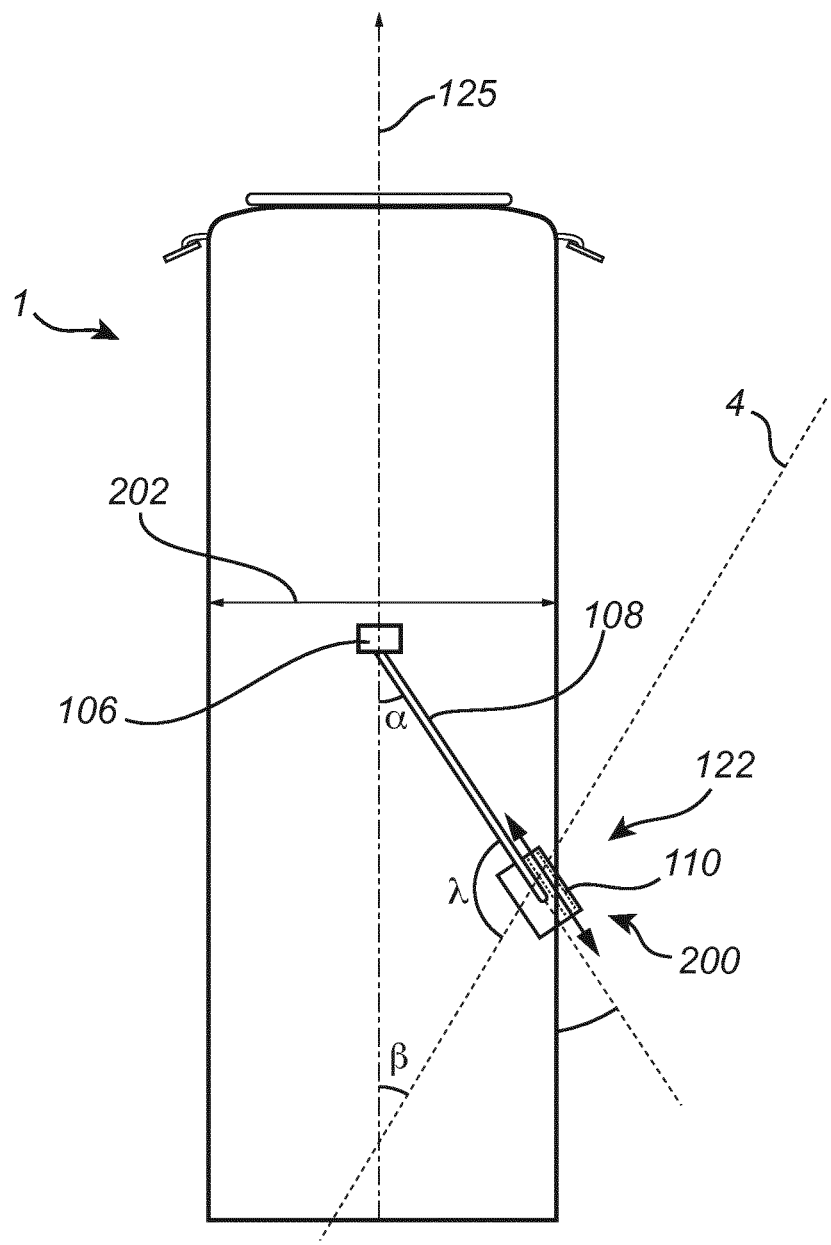
FIG. 2 is a conceptual drawing of embodiments of the invention.

FIG. 2 conceptually illustrates embodiments of the invention and further defines angles and directions for ease of understanding subsequent figures and descriptions. In FIG. 2 a vehicle such as the truck 1 is seen from above. As was described with reference to FIG. 1, the charging device comprises a base 106, a linkage arm 108, and a contact element 110 attached to a charging head 122. In practice and as will be described with reference to e.g. FIG. 4a-c, the contact element 110 (in reality there may be more than one contact element but only one is shown here to avoid cluttering the drawing) is attached to the underside of the charging head 122 and facing the charging surface.

FIG. 2 further defines a vehicle heading 125 and also shows a charging surface trajectory 4. The vehicle heading 125 and the charging surface trajectory 4 are not aligned, thus there is an angle β between the vehicle heading 125 and the charging surface trajectory 4. There is further shown an angle A which is the angle that the contact element 110 needs to be rotated around the axis 105 orthogonal to the figure plane (see also FIG. 1) in order to be aligned with the charging surface trajectory 4. The double arrow 200 illustratively shows the extension of the contact element 110 desirable to align with the charging surface trajectory 4. In case where the contact element 110 is aligned with the linkage arm 108, the angle A can be computed from trigonometry using the angles α and β. However, during active control of the movement of the contact element 110 around the axis 105, the contact element 110 is unlikely aligned with the linkage arm 110 at all times, therefore, in that case an actuator sensor module (not shown) is configured to determine the rotational position of the contact element with respect to e.g. the linkage arm 108 or another reference point.

FIG. 2 further shows an angle α between the vehicle heading 125 and the linkage arm 108. The angle α is associated with one embodiment where the horizontal displacement of the linkage arm is a rotation of the linkage arm such that the angle α is varied. In other embodiments, the angle α is fixed (e.g. at 90°) and instead the horizontal displacement of the linkage arm is a linear displacement in a side-to-side manner as conceptually illustrated by double arrow 202.

In accordance with the above, in order to determine a necessary movement of the contact element 110 and the necessary horizontal displacement of the linkage arm 108 for aligning the contact element 110 with the charging surface trajectory 4, data related to the trajectory of the charging surface 4 is needed, the angle β between the vehicle heading 125 and the charging surface trajectory 4, and the present horizontal displacement (either linear along axis 202 or rotational with angle α) of the linkage arm 108. In some embodiments additional data related to the rotational position (A) needs to be acquired as well.

Figure 3:
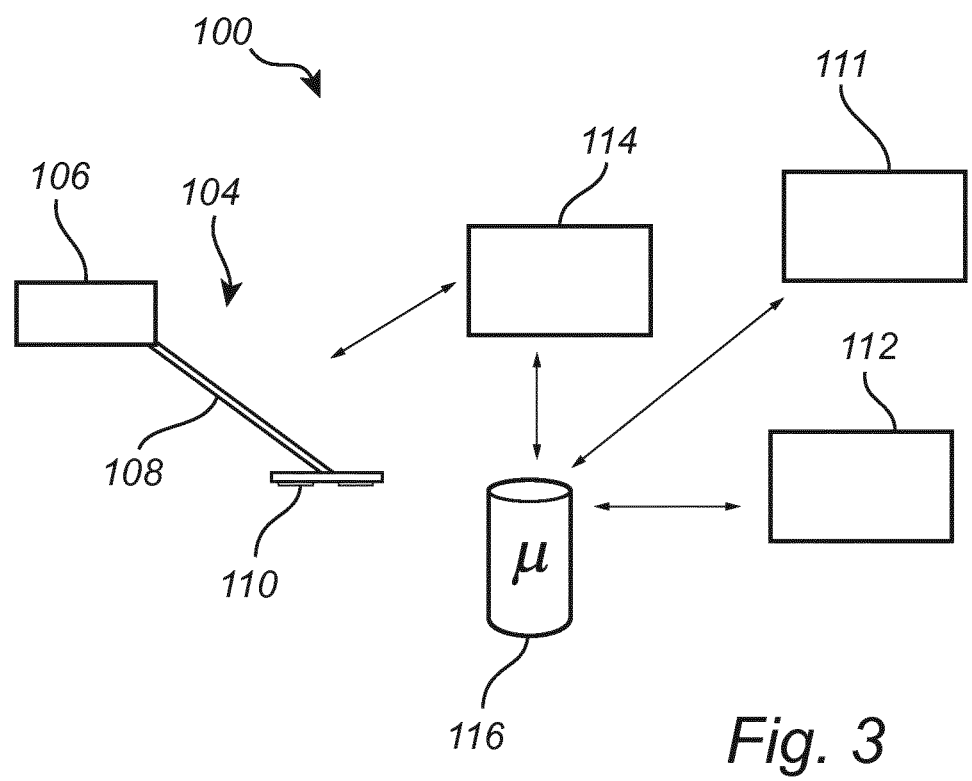
FIG. 3 conceptually illustrates an overview of an arrangement according to an embodiment of the invention.

FIG. 3 illustrates a schematic block diagram of an arrangement 100 for active alignment control of a contact element 110 of a charging device 104 for a vehicle for driving on an electrical road system. The electrical road system comprising a charging surface configured to provide electrical power to the vehicle via the charging device 104. The charging device 104 (see also e.g. FIG. 1 and FIGS. 4a-b, and FIGS. 5a-c) comprises a contact element 110 for making electrical contact with the charging surface of the electrical road system, and a pivot joint (not shown in FIG. 3) which provides for movement of the contact element around an axis 105 substantially perpendicular to the charging surface. The charging device further comprises a base 106 and a linkage arm 108. The contact element 110 and the base 106 are connected to opposite ends of the linkage arm.

As will be described with reference to FIGS. 4a-b, and FIGS. 5a-c, and was described with reference to FIG. 2, the linkage arm 108 is at least horizontally displaceable for aligning the contact element 110 with the charging surface.

The arrangement 100 described in FIG. 3 further comprises a charging surface detection sensor 111 for determining trajectory data indicative of the trajectory of the charging surface. The detection sensor 111 may for example be a camera, a laser, a radar, a lidar, or a similar type of sensor capable of providing forward looking data of the trajectory of the charging surface. In one embodiment, the trajectory data is determined by a charging surface detection sensor 111 in the form of a GPS. With a GPS, the trajectory data is based on data indicative of the road trajectory which is assumed to be parallel with the charging surface trajectory. The arrangement 100 further comprises an angle detection sensor module 112 for determining the angle (β) between a vehicle heading 125 and the charging surface in the horizontal plane. Such a sensor module may comprise a single one or several of a camera, a laser, a radar, a lidar, a steering angle sensor or a similar type of sensor. The charging surface detection sensor 111 and the angle detection sensor module 112 may share sensors. The arrangement 100 also comprises an actuator module 114 for controlling the movement of the electrical contact element around the axis substantially perpendicular to the charging surface and for controlling the horizontal displacement of the linkage arm. The actuator module 114 is controlled by a control unit 116 which is connected to the charging surface detection sensor 111, the actuator module 114, and the angle detection sensor module 112. The control unit 116 is configured to activate the actuator module to align the contact element 110 with the trajectory of the charging surface based on the trajectory data and the angle between the vehicle heading and the charging surface. The actuator module may comprise electrical actuators known in the art.

Figure 4A:
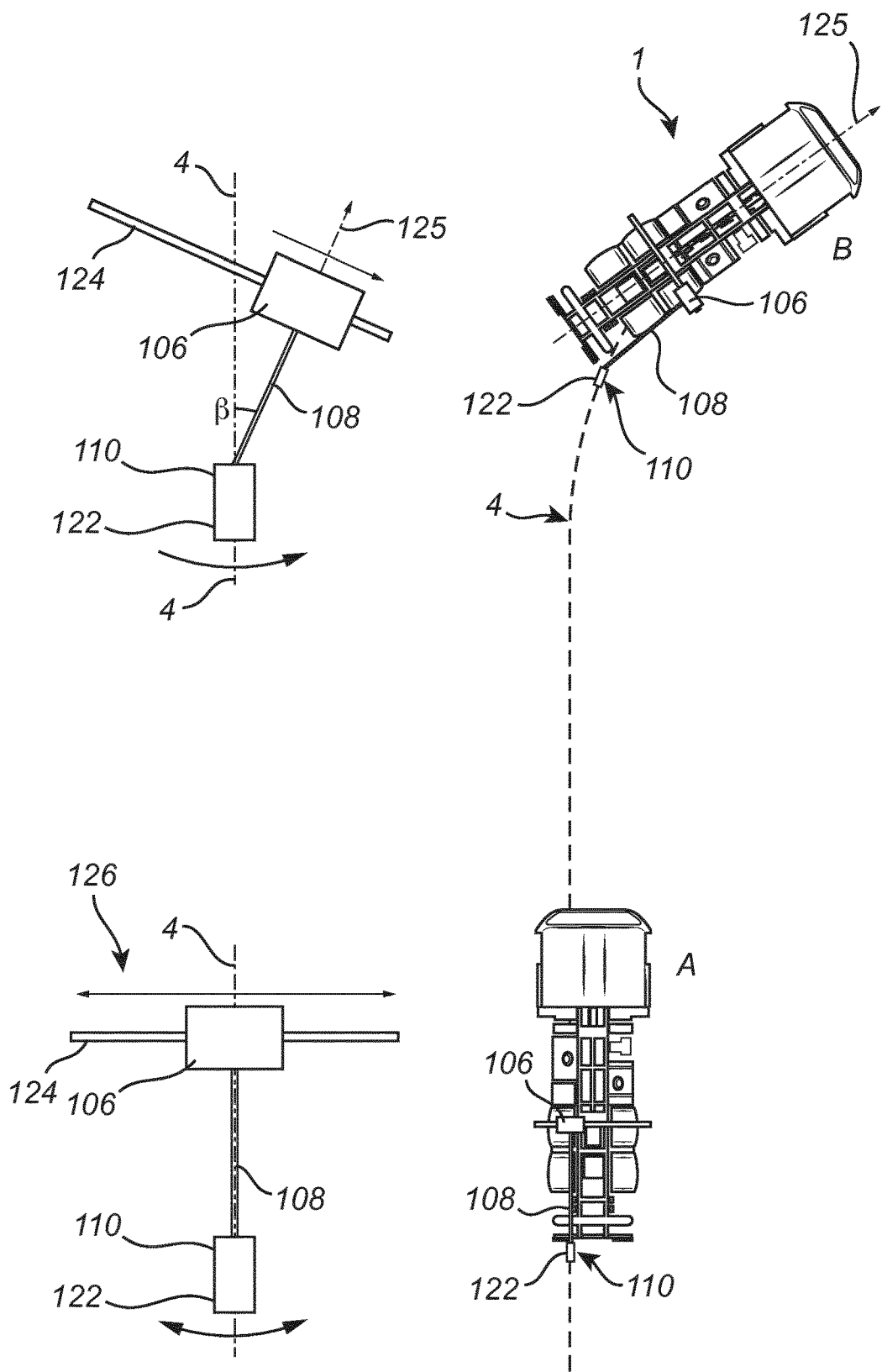
FIG. 4a-b each conceptually illustrates an embodiment of the invention in a respective operative situation.

FIG. 4a conceptually illustrates the operation of one embodiment of the invention. FIG. 4a illustrates a vehicle (e.g. the truck in FIG. 1) driving on a road comprising an electrical road system with an electrical charging surface arranged along a trajectory 4. The truck 1 is equipped with an arrangement for active alignment control of a contact element 110 of a charging device (see 104 in FIG. 1). In the first position (A), the vehicle is driving on a relative straight part of the road and the contact element 110 which is here attached to a charging head 122, is aligned with the trajectory 4 of the charging surface (the charging surface is not shown, but of course follows the trajectory 4). In the embodiment shown in FIG. 4a, the base 104 is arranged on a guiding rail 124 attached to the vehicle. The guiding rail 124 provides for a horizontal displacement of the linkage arm 108 together with the base 106 in a linear fashion in a side-to-side manner on the vehicle 1 as indicated by the double arrow 126. The contact element 110 is further movable (due to a pivot joint, not shown) around an axis substantially perpendicular to the charging surface (here the axis is perpendicular to the plane of the drawing) such that the contact element 110 may be aligned with the trajectory 4 of the charging surface.

With further reference to FIG. 4a, the arrangement comprises a charging surface sensor module (not shown) for determining trajectory data indicative of the trajectory 4, the trajectory data may include for example the location of the trajectory with respect to the vehicle. In addition, the arrangement comprises an angle detection sensor module (not shown but may be e.g. a camera, laser, radar, lidar, a steering sensor, etc) for determining the angle (13) between the vehicle heading 125 and the charging surface trajectory 4 in the horizontal plane (see also FIG. 2). With knowledge of the angle (β) and the horizontal displacement of the linkage arm, a control unit may activate an actuator module (not shown) to move the electrical contact element 110 around the axis substantially perpendicular to the charging surface 4 and to control the horizontal displacement of the linkage arm 108, in this particular case the horizontal displacement is a linear displacement. As shown in FIG. 4a, when the vehicle has moved to the second location (B) and is travelling through a right-turn, the control unit is actively controlling the horizontal displacement of the linkage arm by linearly displacing the base 106 along the guiding rail 124, and actively controlling the rotational position of the contact element 110 such that the contact element is aligned with the charging surface.

Figure 4B:
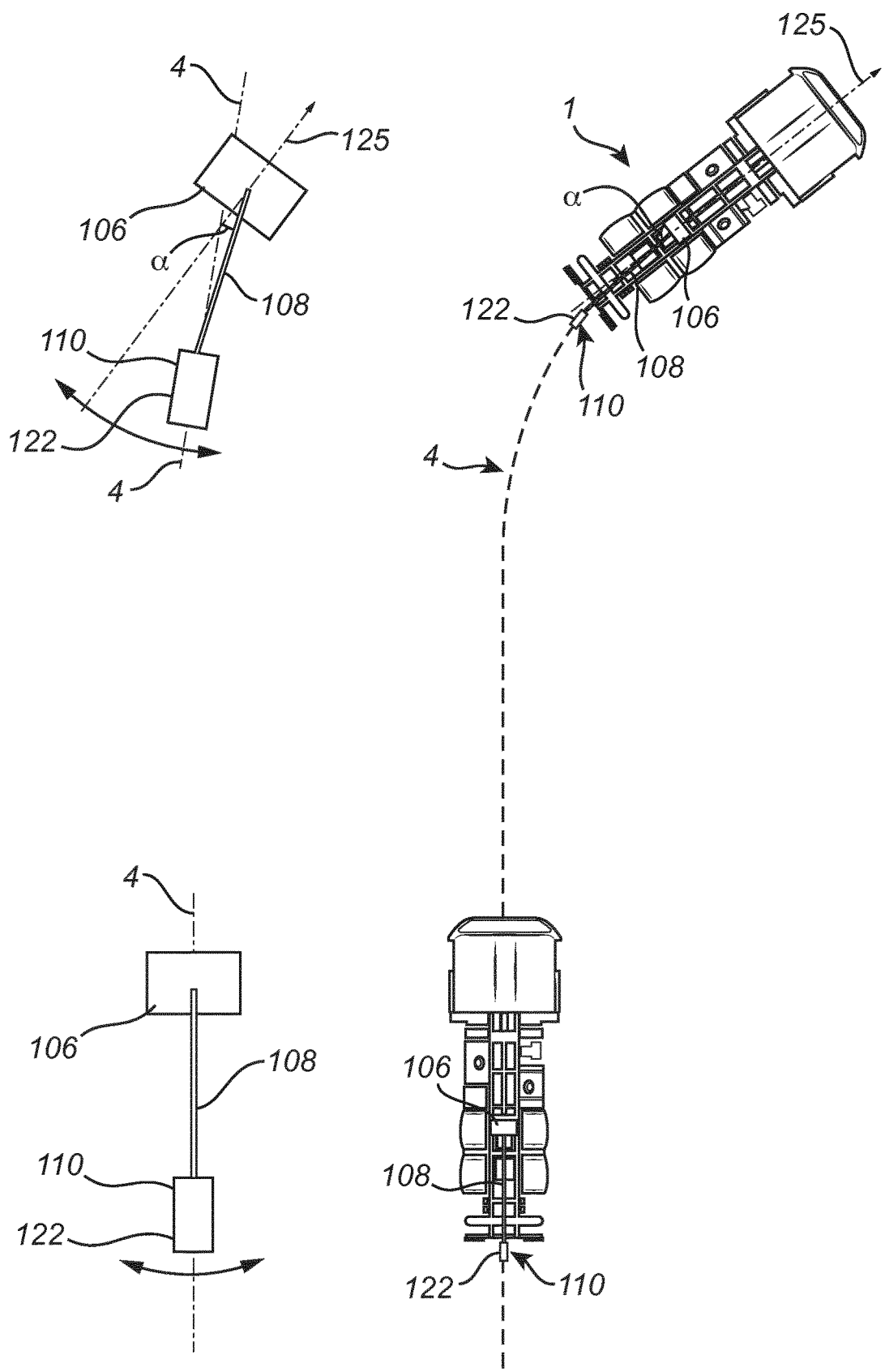

FIG. 4b conceptually illustrates the operation of another embodiment of the invention. The difference between the embodiment depicted in FIG. 4b and the embodiment in FIG. 4a is that the horizontal displacement in FIG. 4b is provided by a rotation of the linkage arm 108 with respect to the base 106. The horizontal displacement is here indicated by the angle α. Thus as the vehicle approaches the turn, the control unit uses knowledge of the angle (β) between a vehicle heading 125 and the charging surface trajectory 4 in the horizontal plane, and the angle α, to actively control an actuator module to control the horizontal displacement (e.g. rotation of the linkage arm), and the rotational position of the contact element 110 such that the contact element is aligned with the charging surface. In some embodiments, also the rotational position (A) of the contact element is used as input by the control unit.

FIGS. 5a-c conceptually illustrates possible locations for a pivot joint 107 that provides the movement of the contact element 110 around the axis 105 substantially perpendicular to the charging surface. In each of FIGS. 5a-c, there is shown a charging head 122 which generally provides a supporting structures for control circuitry for the charging device and the for the contact elements 110

In FIG. 5a, contact elements 110 are arranged on a charging head 122. The charging head 122 is connected to the linkage arm via the pivot joint 107. Thus, the charging head itself is also moveable around the axis 105 for moving the contact elements around the axis 105. Accordingly, the pivot joint 107 joins the linkage arm with the charging head.

In FIG. 5b, contact elements 110 are arranged on a charging head 122. However, here the pivot joints 107 allow for movement of the contact elements 110 with respect to the charging head 122 about the axis 105. Thereby, the pivot joints 107 join the contact element with the charging head 122.

In FIG. 5c, the linkage arm comprises a first portion 108a and a second portion 108a. The pivot joint is arranged to join the first portion with the second portion for providing movement of the contact elements 110 around the axis 105.

Figure 6:
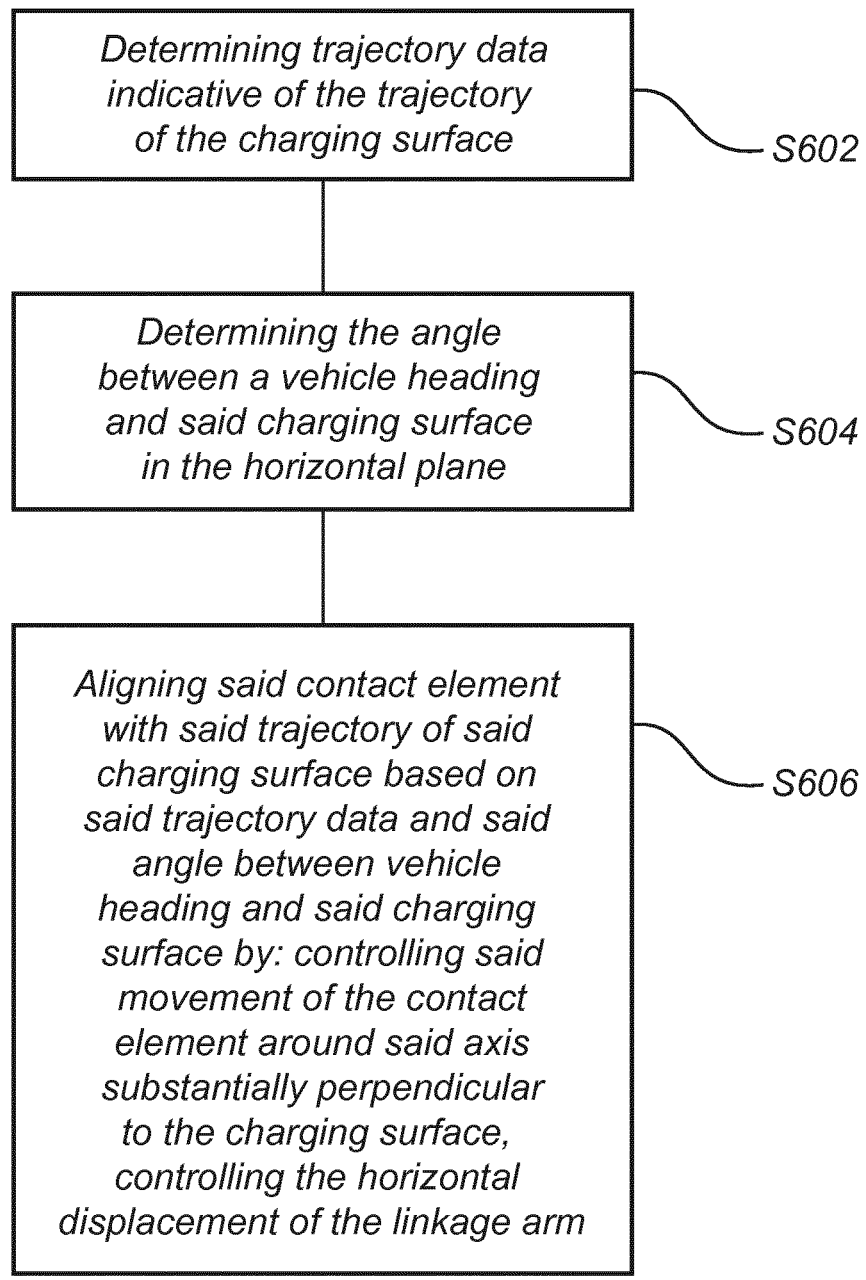
FIG. 6 is a flow-chart of method steps according to embodiments of the invention.

FIG. 6 is a flow-chart of method steps according to an embodiment of the invention. In a first step S602 trajectory data indicative of the trajectory of the charging surface is determined. In another step S604 the angle between a vehicle heading and the charging surface in the horizontal plane is determined. Subsequently, S606 the contact element is aligned with the trajectory of the charging surface based on the trajectory data and the angle between vehicle heading and the charging surface by controlling the movement of the contact element around the axis substantially perpendicular to the charging surface, and controlling the horizontal displacement of the linkage arm.

FIG. 7 conceptually illustrates another embodiment of the invention. The arrangement 700 comprises a charging device (not shown) as described with reference to any on the previous figures. The arrangement 700 further comprises the charging surface detection sensor 111, the angle detection sensor module 112, the actuator module 114, and the control unit as described above. Additionally, the arrangement 600 comprises an actuator sensor module 118 configured to determine measurement data indicative of the horizontal displacement of the linkage arm, and a rotation position of the contact element around the axis. The actuator sensor module 118 may be a separate module or it may be part of the actuator module, thus actuator sensor module 118 may be internal to the actuator module 114. The rotational position may be provided via an encoder which provides a step value indicative of the rotational position. The actuator sensor module is configured to provide the measurement data to the control unit 116. The control unit 116 is configured to activate the actuator module 114 to align the contact element 110 with the trajectory of the charging surface based on the trajectory data, the angle between the vehicle heading and the charging surface, and the measurement data. The arrangement may be operating as feedback system where the actuator sensor module continuously feeds back measurement data to the control unit which together with updated trajectory data and angle data (β) may update the controlling of the actuator module 114.

The control unit (e.g. control unit 116) may include a microprocessor, microcontroller, programmable digital signal processor or another programmable device. Thus, the control unit 116 may comprise electronic circuits and connections (not shown) as well as processing circuitry (not shown) such that the control unit 116 can communicate with different parts of the truck 1 such as the brakes, suspension, driveline, in particular an electrical engine, an electric machine, a clutch, and a gearbox in order to at least partly operate the truck 1. The control unit 116 may comprise modules in either hardware or software, or partially in hardware or software and communicate using known transmission buses such as CAN-bus and/or wireless communication capabilities. The processing circuitry may be a general purpose processor or a specific processor. The control unit 116 may comprise a non-transitory memory for storing computer program code and data upon. Thus, the skilled addressee realizes that the control unit 116 may be embodied by many different constructions.

The control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art.

It is to be understood that the present invention is not limited to the embodiments described above and illustrated in the drawings; rather, the skilled person will recognize that many changes and modifications may be made within the scope of the appended claims.

The invention claimed is:

1. An arrangement for active alignment control of a contact element of a charging device for a vehicle for driving on an electrical road system comprising a charging surface configured to provide electrical power to the vehicle via the charging device, wherein the arrangement is characterized by: the charging device comprising a base, a linkage arm, and an electrical contact element for making electrical contact with said charging surface of the electrical road system, and a pivot joint arranged for allowing a movement of the contact element around an axis substantially perpendicular to the charging surface; wherein the contact element and the base are connected to opposite ends of said linkage arm, and wherein the linkage arm is at least horizontally displaceable for aligning the contact element with the charging surface; a charging surface detection sensor for determining trajectory data indicative of the trajectory of the charging surface; an angle detection sensor module for determining the angle between a vehicle heading and said charging surface in the horizontal plane; an actuator module for controlling said movement of the electrical contact element around said axis substantially perpendicular to the charging surface and for controlling the horizontal displacement of the linkage arm, and a control unit connected to said charging surface detection sensor, and said angle detection sensor module, and said actuator module and configured to activate said actuator module to align said contact element with said trajectory of said charging surface based on said trajectory data and said angle between the vehicle heading and said charging surface.

2. The arrangement according to claim 1, characterized by: an actuator sensor module configured to determine measurement data indicative of the horizontal displacement of the linkage arm, and a rotation position of the contact element around said axis, wherein the actuator sensor module is configured to provide said measurement data to said control unit, whereby said control unit is configured to activate said actuator module to align said contact element with said trajectory of said charging surface based on said trajectory data, said angle between the vehicle heading and said charging surface, and said measurement data.

3. The arrangement according to claim 1 characterized in that said horizontal displacement is a rotational displacement a rotation angle of said linkage arm with respect to said base.

4. The arrangement according to claim 3 characterized in that said control unit is configured to activate said actuator module to control said rotation angle of the linkage arm with respect to the base for aligning said contact element with said trajectory of said charging surface.

5. The arrangement according to claim 1 characterized in that said horizontal displacement is a linear displacement of said base with respect to a guiding rail on which said base is guided.

6. The arrangement according to claim 5 characterized in that said control unit is configured to activate said actuator module to control said linear displacement of the linkage arm with respect to the base for aligning said contact element with said trajectory of said charging surface.

7. The arrangement according to claim 1 characterized in that said linkage arm comprises a first portion and a second portion, wherein the pivot joint is arranged to join said first portion with said second portion.

8. The arrangement according to claim 1 characterized in that said charging device comprises a charging head on which said charging element is attached, wherein said pivot joint is arranged to join the linkage arm with the charging head.

9. The arrangement according to claim 1 characterized in that said charging device comprises a charging head on which said charging element is attached, wherein said charging head is mechanically attached to said linkage arm, and wherein said pivot joint is arranged to join the charging head with the charging element.

10. The arrangement according to claim 1, wherein the angle detection sensor is one of a steering sensor for said vehicle, a camera, a laser sensor, a lidar, or a radar.

11. The arrangement according to claim 1, wherein the charging surface detection sensor is one of a, a camera, a laser sensor, a lidar, a global positioning system, or a radar.

12. A vehicle comprising:
a charging surface configured to provide electrical power to the vehicle via a charging device, the charging device comprising a base, a linkage arm, and an electrical contact element for making electrical contact with said charging surface of the electrical road system, and a pivot joint arranged for allowing a movement of a contact element around an axis substantially perpendicular to the charging surface; wherein the contact element and the base are connected to opposite ends of said linkage arm, and wherein the linkage arm is at least horizontally displaceable for aligning the contact element with the charging surface; a charging surface detection sensor for determining trajectory data indicative of the trajectory of the charging surface; an angle detection sensor module for determining the angle between a vehicle heading and said charging surface in the horizontal plane; an actuator module for controlling said movement of the electrical contact element around said axis substantially perpendicular to the charging surface and for controlling the horizontal displacement of the linkage arm, and a control unit connected to said charging surface detection sensor, and said angle detection sensor module, and said actuator module and configured to activate said actuator module to align said contact element with said trajectory of said charging surface based on said trajectory data and said angle between the vehicle heading and said charging surface.

13. A method for active alignment control a contact element of a charging device for a vehicle for driving on an electrical road system, said charging device comprising a base, a linkage arm, and an electrical contact element for making electrical contact with a charging surface of the electrical road system, and a pivot joint arranged for allowing a movement of the contact element around an axis substantially perpendicular to the charging surface; wherein the contact element and the base are connected to opposite ends of said linkage arm, and wherein the linkage arm is at least horizontally displaceable for aligning the contact element with the charging surface; characterized by: determining trajectory data indicative of the trajectory of the charging surface; determining the angle between a vehicle heading and said charging surface in the horizontal plane; aligning said contact element with said trajectory of said charging surface based on said trajectory data and said angle between vehicle heading and said charging surface by: controlling said movement of the contact element around said axis substantially perpendicular to the charging surface, and controlling the horizontal displacement of the linkage arm.

14. The method according to claim 13 characterized by: determining measurement data indicative of the horizontal position of the linkage arm, and a rotation position of the contact element around said axis, wherein said aligning is further based on said measurement data.

15. A non-transitory computer readable medium carrying a computer program comprising program code for controlling active alignment control a contact element of a charging device for a vehicle for driving on an electrical road system, said charging device comprising a base, a linkage arm, and an electrical contact element for making electrical contact with a charging surface of the electrical road system, and a pivot joint arranged for allowing a movement of the contact element around an axis substantially perpendicular to the charging surface; wherein the contact element and the base are connected to opposite ends of said linkage arm, and wherein the linkage arm is at least horizontally displaceable for aligning the contact element with the charging surface, a processor when executing the computer-readable instructions is configured to:
- determine trajectory data indicative of the trajectory of the charging surface;
- determine the angle between a vehicle heading and said charging surface in the horizontal plane;
- align said contact element with said trajectory of said charging surface based on said trajectory data and said angle between vehicle heading and said charging surface by: controlling said movement of the contact element around said axis substantially perpendicular to the charging surface, and controlling the horizontal displacement of the linkage arm.

16. A control unit for controlling active alignment control a contact element of a charging device for a vehicle for driving on an electrical road system (ERS), said charging device comprising a base, a linkage arm, and an electrical contact element for making electrical contact with a charging surface of the electrical road system, and a pivot joint arranged for allowing a movement of the contact element around an axis substantially perpendicular to the charging surface; wherein the contact element and the base are connected to opposite ends of said linkage arm, and wherein the linkage arm is at least horizontally displaceable for aligning the contact element with the charging surface; the control unit being configured to perform a method comprising:
- determining trajectory data indicative of the trajectory of the charging surface;
- determining the angle between a vehicle heading and said charging surface in the horizontal plane;
- aligning said contact element with said trajectory of said charging surface based on said trajectory data and said angle between vehicle heading and said charging surface by: controlling said movement of the contact element around said axis substantially perpendicular to the charging surface, and controlling the horizontal displacement of the linkage arm.

* * * * *